US009424415B2

(12) United States Patent
Mori

(10) Patent No.: US 9,424,415 B2
(45) Date of Patent: Aug. 23, 2016

(54) INFORMATION PROCESSING APPARATUS, INFORMATION PROCESSING METHOD, AND NON-TRANSITORY COMPUTER READABLE MEDIUM FOR DETERMINING WHETHER AUTHENTICATED STATE IS MAINTAINED

(71) Applicant: FUJI XEROX CO., LTD., Minato-ku, Tokyo (JP)

(72) Inventor: Yasuhiro Mori, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/306,388

(22) Filed: Jun. 17, 2014

(65) Prior Publication Data

US 2015/0058971 A1 Feb. 26, 2015

(30) Foreign Application Priority Data

Aug. 20, 2013 (JP) ................. 2013-170339

(51) Int. Cl.
| | |
|---|---|
| *G06F 21/40* | (2013.01) |
| *G06F 21/31* | (2013.01) |
| *G06F 21/60* | (2013.01) |
| *G06F 21/32* | (2013.01) |

(52) U.S. Cl.
CPC ............. *G06F 21/40* (2013.01); *G06F 21/31* (2013.01); *G06F 21/608* (2013.01); *G06F 21/32* (2013.01)

(58) Field of Classification Search
CPC ........ G06F 21/31; G06F 21/40; G06F 21/608
See application file for complete search history.

(56) References Cited

U.S. PATENT DOCUMENTS

| 6,697,947 | B1 * | 2/2004 | Matyas et al. ................. 713/182 |
| 6,724,862 | B1 * | 4/2004 | Shaffer et al. .................... 379/52 |
| 2006/0288234 | A1 * | 12/2006 | Azar et al. ..................... 713/186 |
| 2008/0289032 | A1 * | 11/2008 | Aoki et al. ........................ 726/19 |
| 2010/0115589 | A1 * | 5/2010 | Tawada .............................. 726/4 |
| 2011/0093939 | A1 * | 4/2011 | Barbour et al. .................... 726/7 |
| 2011/0154212 | A1 * | 6/2011 | Gharpure et al. ............. 715/738 |
| 2011/0167727 | A1 * | 7/2011 | Kamise .................. E05G 5/003 49/70 |

FOREIGN PATENT DOCUMENTS

| JP | 8-26587 A | 1/1996 |
| JP | 2002-370421 A | 12/2002 |

(Continued)

*Primary Examiner* — Robert Leung
(74) *Attorney, Agent, or Firm* — Sughrue Mion, PLLC

(57) ABSTRACT

An information processing apparatus is provided. The processing apparatus includes a first acquiring unit that acquires information for specifying an operator, an operator authenticating unit that authenticates the operator, a first determining unit that determines whether information on the operator is continuously acquired, a second acquiring unit that acquires information for specifying a checker, a checker authenticating unit that authenticates a checker corresponding to the operator, a second determining unit that determines whether information on the checker is continuously acquired, and a controller that controls a processing apparatus to execute processing, on the condition that the operator is authenticated and the checker is authenticated. The controller controls the processing apparatus to continue the processing, on a condition that, after execution of the processing by the processing apparatus, the information on the operator is determined to be continuously acquired, or the information on the checker is determined to be continuously acquired.

3 Claims, 13 Drawing Sheets

(56) References Cited

FOREIGN PATENT DOCUMENTS

| JP | 2005-35294 A | 2/2005 | | |
| JP | 2005-257973 A | 9/2005 | | |
| JP | 2007-295294 A | 11/2007 | | |
| JP | 2008-112231 A | 5/2008 | | |
| JP | 2012-74935 A | 4/2012 | | |
| WO | WO2009132046 | * | 10/2009 | ............ G06F 21/24 |

* cited by examiner

FIG. 4
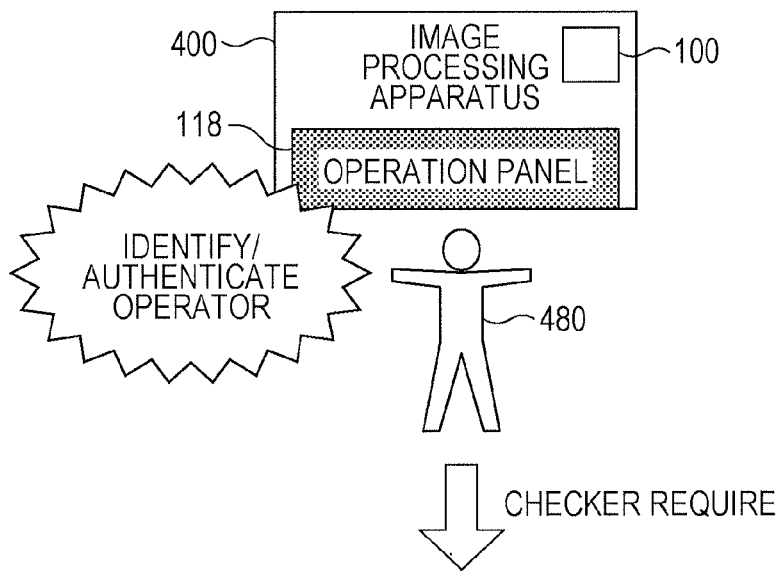
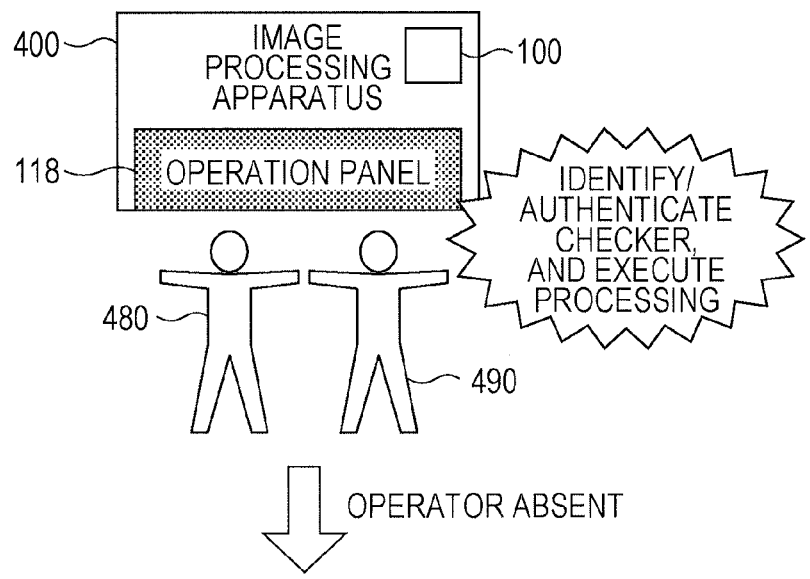
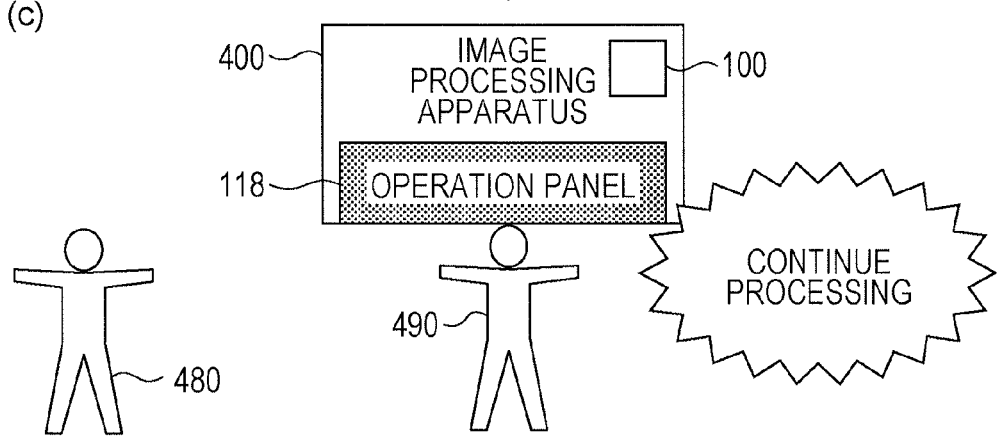

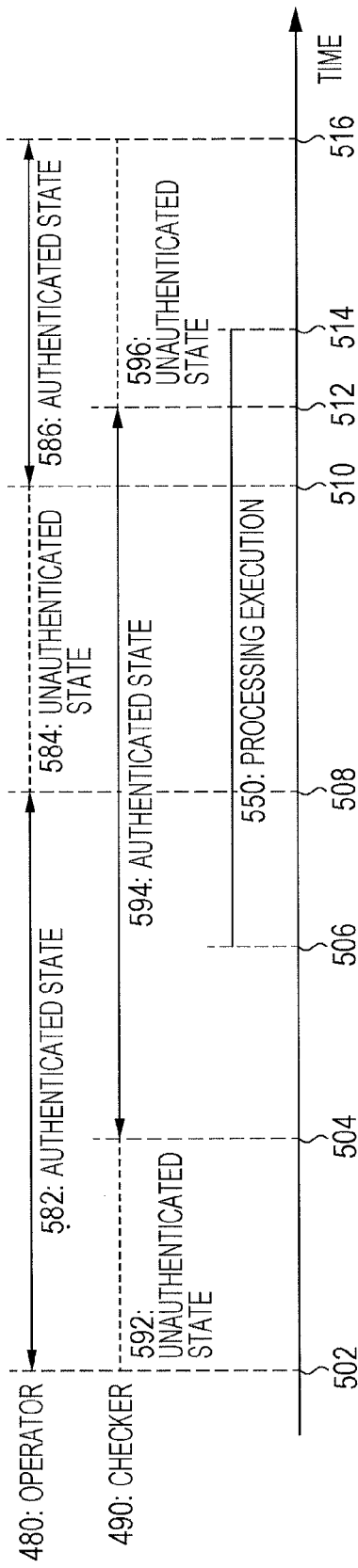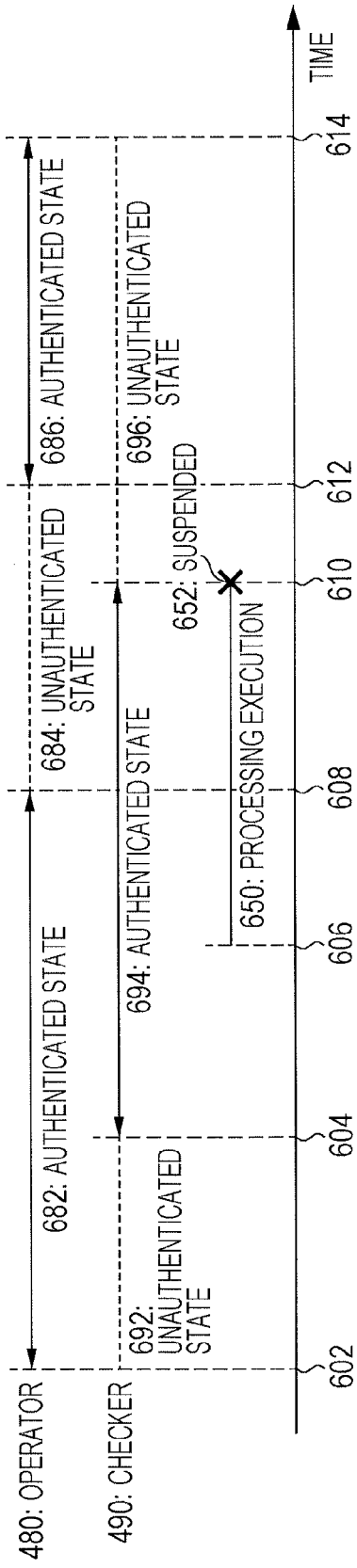

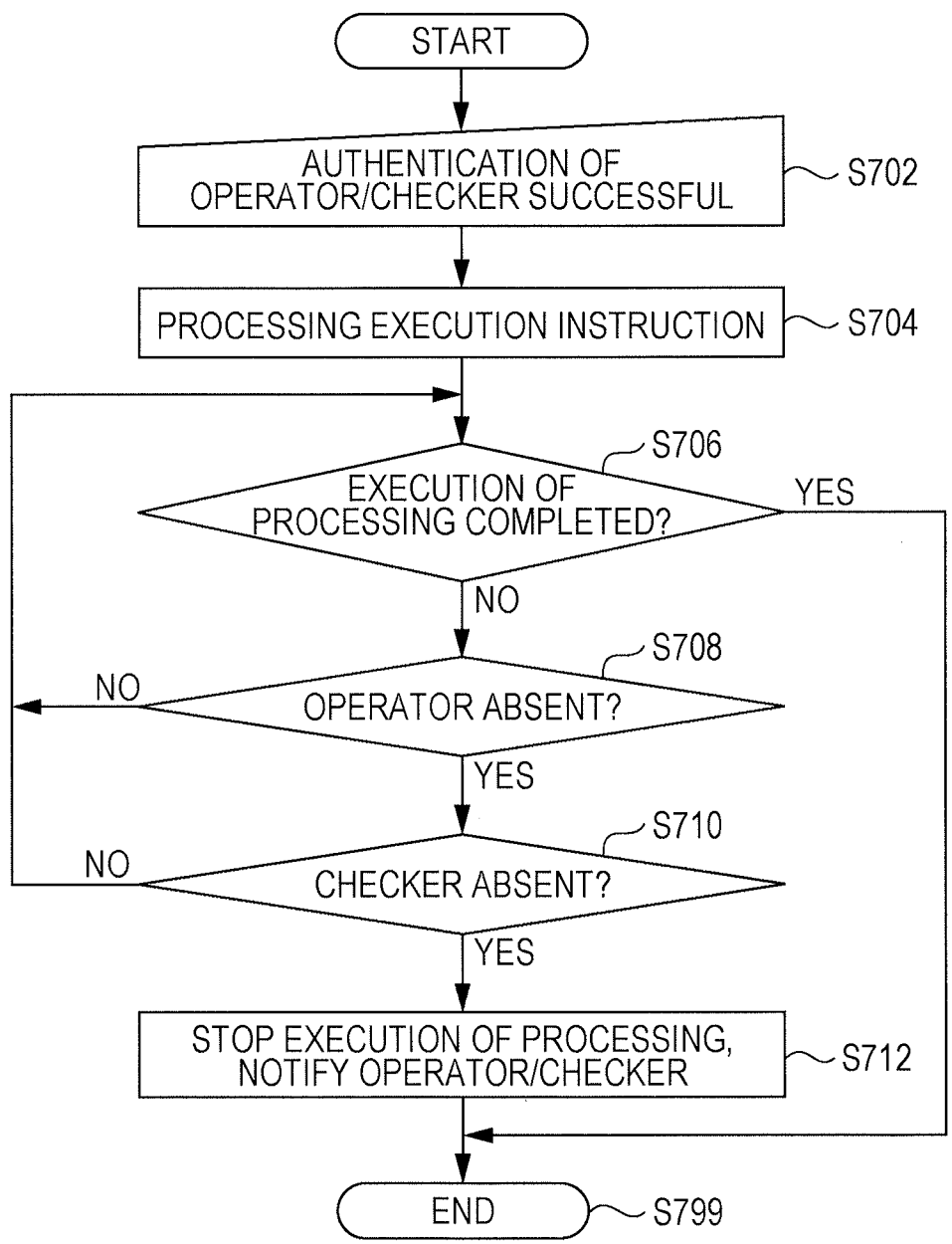

FIG. 9

| OPERATOR 910 | OPERATOR AUTHENTICATION STATUS 920 | THRESHOLD FOR DOCUMENT PAGES TO BE PRINTED 930 | THRESHOLD FOR DOCUMENT PAGES TO BE READ 940 | SCHEDULE (OPERATOR) 950 | CHECKER 960 | CHECKER AUTHENTICATION STATUS 970 | SCHEDULE (CHECKER) 980 |
|---|---|---|---|---|---|---|---|
| A | UNAUTHENTICATED | 30 | 50 | 10:30 | SECRETARY a | AUTHENTICATED | 10:40 |
|   |   |   |   |   | SECRETARY b |   | 11:30 |
| B | AUTHENTICATED | 50 | 50 | 11:00 | SECRETARY c | UNAUTHENTICATED | 11:00 |
|   |   |   |   |   | SECRETARY d |   | 12:00 |

900

INFORMATION PROCESSING APPARATUS, INFORMATION PROCESSING METHOD, AND NON-TRANSITORY COMPUTER READABLE MEDIUM FOR DETERMINING WHETHER AUTHENTICATED STATE IS MAINTAINED

CROSS-REFERENCE TO RELATED APPLICATIONS

This application is based on and claims priority under 35 USC 119 from Japanese Patent Application No. 2013-170339 filed Aug. 20, 2013.

BACKGROUND

Technical Field

The present invention relates to an information processing apparatus, an information processing method, and a non-transitory computer readable medium.

SUMMARY

According to an aspect of the invention, there is provided an information processing apparatus including: a first acquiring unit configured to acquire information for specifying an operator; an operator authenticating unit configured to authenticate the operator on the basis of the information for specifying the operator which is acquired by the first acquiring unit; a first determining unit configured to determine whether information on the operator authenticated by the operator authenticating unit is continuously acquired; a second acquiring unit configured to acquire information for specifying a checker; a checker authenticating unit configured to authenticate a checker corresponding to the operator authenticated by the operator authenticating unit, on the basis of the information for specifying the checker that is acquired by the second acquiring unit, using a memory storing operator identification information for identifying the operator and checker identification information for identifying the checker corresponding to the operator; a second determining unit configured to determine whether information on the checker authenticated by the checker authenticating unit is continuously acquired; and a controller configured to control a processing apparatus to execute processing on the basis of an operation by the operator, on a condition that the operator is authenticated by the operator authenticating unit and the checker is authenticated by the checker authenticating unit. The controller controls the processing apparatus to continue the processing, on a condition that, after execution of the processing by the processing apparatus, the first determining unit determines that the information on the operator is continuously acquired, or the second determining unit determines that the information on the checker is continuously acquired.

BRIEF DESCRIPTION OF THE DRAWINGS

Exemplary embodiments of the present invention will be described in detail based on the following figures, wherein:

FIG. 4 illustrates an example of a process according to the first exemplary embodiment;

FIG. 5 illustrates an example of the relationship between the authentication status and execution of processing;

FIG. 6 illustrates an example of the relationship between the authentication status and execution of processing;

FIG. 7 is a flowchart illustrating an example of a process according to the first exemplary embodiment;

FIG. 9 illustrates an example of the data configuration of an authentication information table;

DETAILED DESCRIPTION

Hereinafter, exemplary embodiments of the present invention will be described in detail with reference to the accompanying drawings.

First Exemplary Embodiment

Figure 1:
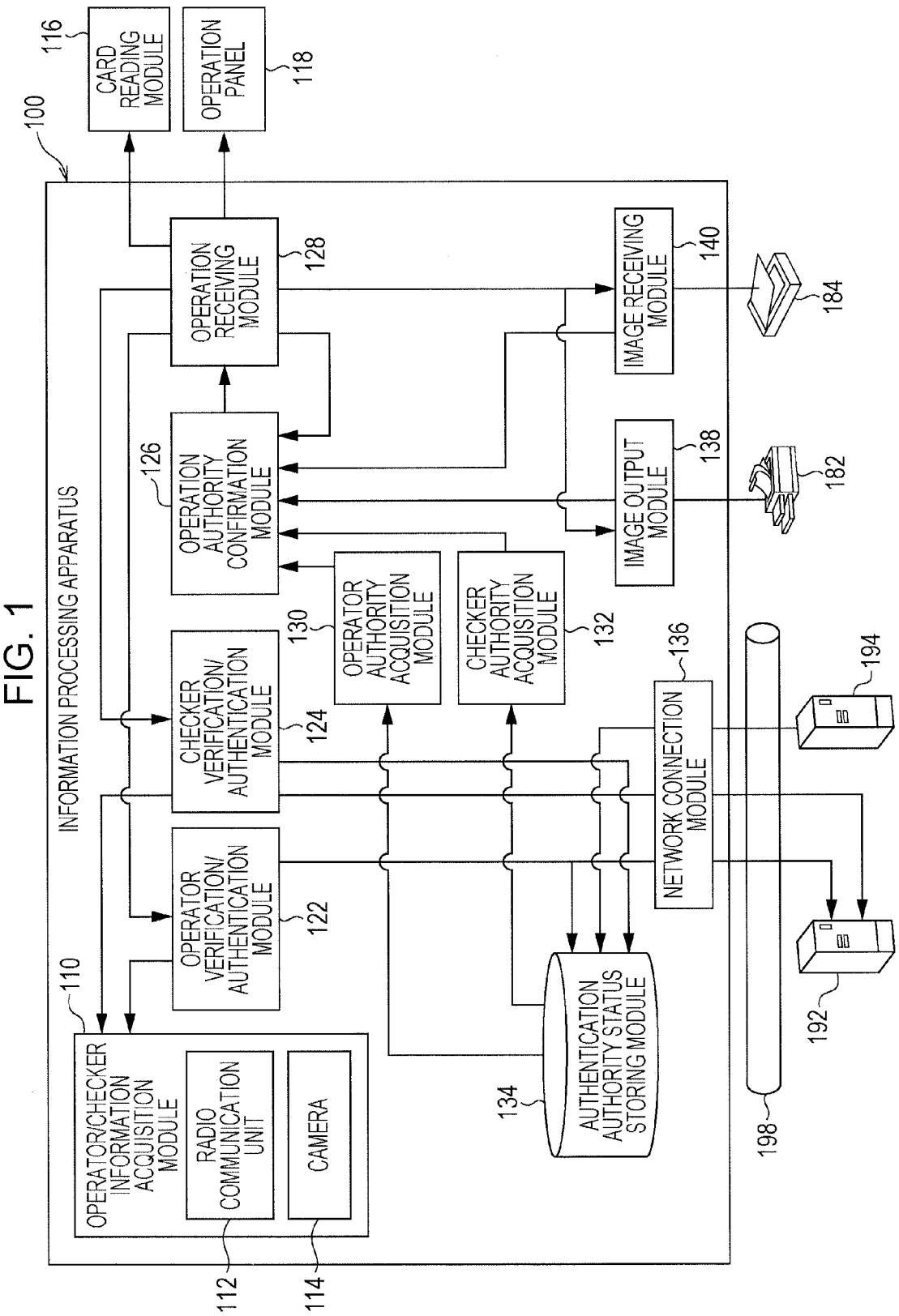
FIG. 1 is a conceptual module configuration diagram illustrating an example of the configuration of a first exemplary embodiment.

FIG. 1 is a conceptual module configuration diagram illustrating an example of the configuration of a first exemplary embodiment.

The term "module" generally refers to a component of software (computer program) or hardware which is logically separable. Accordingly, the term "module" as used in this exemplary embodiment refers not only to a module in a computer program but also to a module in a hardware configuration. Therefore, the description of this exemplary embodiment serves as a description of a computer program for causing a computer to function as such modules (a program for causing a computer to execute respective procedures, a program for causing a computer to function as respective units, and a program for causing a computer to realize respective functions), a system, and a method. For the convenience of description, phrases "store" and "cause . . . to store", and phrases equivalent thereto will be used. These phrases specifically mean "cause a storage device to store" or "control a storage device to store" in the case where an exemplary embodiment is implemented as a computer program. Each module may have a one-to-one relationship with a function. In terms of packaging, a single module may be constituted by a single program, or multiple modules may be constituted by a single program. Conversely, a single module may be constituted by multiple programs. Also, multiple modules may be executed by a single computer, or a single module may be executed by multiple computers in a distributed or parallel environment. A single module may include another module. Furthermore, the term "connection" as used herein refers not only to physical connection but also to logical connection (such as exchange of data, instructions, and data reference relationship). The term "predetermined" refers to being determined prior to a process of interest is performed. That is, this term has the meaning of being determined prior to a process of interest, in accordance with a present situation or state or in accordance with a previous situation or state, before an operation of this exemplary embodiment is started, or even after an operation of this exemplary embodiment is started. If there are plural "predetermined values", these values may differ from each other, or two or more (or all) of these values may be equal to each other. The expression "if A, do B" is used to indicate that "determine whether A is true, and do B if A is true". However, this does not apply to the case where it is not necessary to determine whether A is true.

A system or an apparatus may be realized by multiple computers, hardware units, devices, or the like that are connected to one another via a communication medium, such as a network (including communication connection having a one-to-one correspondence), or may be realized by a single computer, hardware unit, device, or the like. The terms "apparatus" and "system" are used synonymously. Of course, the "system" does not include mere social "mechanisms" (social systems) based on human arrangements.

Information to be processed is read from a storage device in individual processes performed by respective modules or in individual processes performed by a single module. After each process is performed, the processing results are written into the storage device. Accordingly, a description about reading from the storage device before the process and writing into the storage device after the process may be omitted. Examples of storage devices used herein may include a hard disk, a random access memory (RAM), an external storage medium, a storage device connected through a communication line, a register in a central processing unit (CPU), and the like.

An information processing apparatus 100 according to this exemplary embodiment is configured to control operations performed by a printer 182 and/or a scanner 184, which are examples of processing apparatuses. As illustrated in the example of FIG. 1, the information processing apparatus 100 includes an operator/checker information acquisition module 110, an operator verification/authentication module 122, a checker verification/authentication module 124, an operation authority confirmation module 126, an operation receiving module 128, an operator authority acquisition module 130, a checker authority acquisition module 132, an authentication authority status storing module 134, a network connection module 136, an image output module 138, and an image receiving module 140. Processing by the printer 182 and/or the scanner 184 is executed, on the condition that both the operator and the checker are authenticated. Further, the processing by the printer 182 and/or the scanner 184 is continued, on the condition that the authenticated state in which both the operator and the checker are authenticated is maintained. Processing that requires that both the operator and the checker are authenticated may be predetermined processing (or processing that satisfies a predetermined condition). Note that the phrase "the printer 182 and/or the scanner 184" is used to indicate either one of the printer 182 and the scanner 184 or the both.

A card reading module 116 is connected to the operation receiving module 128. The card reading module 116 reads operator identification information (operator ID) and checker identification information (checker ID) for uniquely identifying the operator and the checker, respectively, in this exemplary embodiment.

An operation panel 118 is connected to the operation receiving module 128. The operation panel 118 may include a keyboard, a mouse, and a touch panel, and receives an operation by the operator or checker. Examples of operations by the operator or checker include an operation of inputting a password or the like. The operation panel 118 also receives an operation with respect to the printer 182 and/or the scanner 184. Examples of such operations includes an operation for starting scanning, setting the number of pages to be copied, setting the paper size, and operations for starting other processing.

The operation receiving module 128 is connected to the operator verification/authentication module 122, the checker verification/authentication module 124, the operation authority confirmation module 126, the image output module 138, the image receiving module 140, the card reading module 116, and the operation panel 118. In accordance with information transmitted from the card reading module 116 and the operation panel 118, the operation receiving module 128 transmits information to other modules. For example, in the case of a login operation, the operation receiving module 128 transmits information to the operator verification/authentication module 122 and the checker verification/authentication module 124. In the case of an operation with respect to the printer 182 and/or the scanner 184, the operation receiving module 128 transmits information to the image output module 138 and the image receiving module 140.

The operator/checker information acquisition module 110 is connected to the operator verification/authentication module 122 and the checker verification/authentication module 124, and includes a radio communication unit 112 and a camera 114. The operator/checker information acquisition module 110 serves to determine whether the authenticated state of the operator or checker is maintained. The phrase "the authenticated state is maintained" means that, after the operator or checker is authenticated using the card reading module 116 and so on, the authenticated operator or the checker is in the vicinity of the printer 182 and/or the scanner 184. Further, "maintaining the authenticated state" includes at least continuously acquiring the same information as that acquired at the time of authenticating the user (operator or checker). This is, for example, acquiring information for specifying the user for authentication; then acquiring information recorded in an IC card storing information for specifying the user or biological information (such as a face image) multiple times; and maintaining the authentication state on the basis of the acquired information, each time the information is acquired.

Further, "authenticating the operator or checker using the card reading module 116 and so on" means, when using the printer 182 and/or the scanner 184, reading information recorded in an IC card or the like storing the operator ID of the operator or the checker ID of the checker; causing the operator or the checker to enter the password or the like on the operation panel 118; determining whether the operator or the checker is allowed to use the printer 182 and/or the scanner 184, using an authentication authority information database 192; and determining that the use is allowed, for example. This is so-called a login operation. Obviously, other than using an IC card, the login operation may be performed by using a user ID and password that are entered or by identifying biological information.

The condition that "the authenticated operator or the checker is in the vicinity of the printer 182 and/or the scanner 184" is applied in order to prevent the operator or the checker from leaving the printer 182 and/or the scanner 184 after the first login operation is formally performed. More specifically, the radio communication unit 112 performs short-range communication with a mobile device (such as mobile phones including smartphones). Then, in the case where the short-range communication is being performed, or in the case where the distance can be measured by the short-range communication, if the measured distance is less than or equal to a predetermined value, "the authenticated state is maintained". Further, the camera 114 captures an image of the operator or checker, and performs face recognition by extracting the captured face image. Then, in the case where an authenticated operator or checker is in the captured image, "the authenticated state is maintained". Since the radio communication unit 112 and the camera 114 are provided in the printer 182 and/or the scanner 184, and therefore "the vicinity of the printer 182 and/or the scanner 184" is synonymous with "the vicinity of the radio communication unit 112 and the camera 114".

The operator verification/authentication module 122 is connected to the operator/checker information acquisition module 110, the operation receiving module 128, the authentication authority status storing module 134, and the network connection module 136. The operator verification/authentication module 122 authenticates an operator. More specifically, the operator verification/authentication module 122 communicates with the authentication authority information database 192 and authenticates an operator, on the basis of information for authentication that is received from the operation receiving module 128. Then, the operator verification/authentication module 122 determines whether the authenticated state of the authenticated operator is maintained. More specifically, the operator verification/authentication module 122 determines whether the operator is in the vicinity of the printer 182 and/or the scanner 184, on the basis of information from the operator/checker information acquisition module 110.

The checker verification/authentication module 124 is connected to the operator/checker information acquisition module 110, the operation receiving module 128, the authentication authority status storing module 134, and the network connection module 136. The checker verification/authentication module 124 authenticates a checker corresponding to the operator authenticated by the operator verification/authentication module 122, using the authentication authority status storing module 134. More specifically, the checker verification/authentication module 124 communicates with the authentication authority information database 192 and authenticates the checker, on the basis of information for authentication that is received from the operation receiving module 128. A determination as to whether the checker corresponds to the operator is made using information stored in the authentication authority status storing module 134 or the authentication authority information database 192. Then, the checker verification/authentication module 124 determines whether the authenticated state of the authenticated checker is maintained. More specifically, the checker verification/authentication module 124 determines whether the checker is in the vicinity of the printer 182 and/or the scanner 184, on the basis of information from the operator/checker information acquisition module 110. Note that this determination is performed after authentication of the operator is performed or when the operator is in the authenticated state.

The checker verification/authentication module 124 performs authentication of the checker if the processing content to be executed by the processing apparatus satisfies a predetermined condition. For example, in the case where the processing apparatus is the printer 182 or the scanner 184, the predetermined condition is any one of or any combination of the following conditions: (1) the amount of image data to be processed is equal to or greater than a predetermined value; (2) the processing time is equal to or greater than a predetermined value; and (3) the operator has a scheduled event during execution of processing by the processing apparatus.

The operation authority confirmation module 126 is connected to the operation receiving module 128, the operator authority acquisition module 130, the checker authority acquisition module 132, the image output module 138, and the image receiving module 140. The operation authority confirmation module 126 controls the processing apparatus to execute processing on the basis of an operation by the operator, on the condition that the operator is authenticated by the operator verification/authentication module 122 and the checker is authenticated by the checker verification/authentication module 124.

Further, the operation authority confirmation module 126 controls the processing apparatus to continue the processing, on the condition that, after execution of the processing by the processing apparatus, the operator verification/authentication module 122 determines that the authenticated state of the operator is maintained, or the checker verification/authentication module 124 determines that the authenticated state of the checker is maintained.

Further, the operation authority confirmation module 126 may determine whether the processing content specified by an operation by the operator is within the authority of the operator (for example, a threshold for the number of document pages to be printed in one batch by the printer 182), on the basis of information from the operator authority acquisition module 130.

Further, the operation authority confirmation module 126 may determine whether the processing content specified by an operation by the operator is within the authority of the checker (for example, a threshold for the number of document pages allowed to be printed in one batch by the printer 182), on the basis of information from the checker authority acquisition module 132.

The operator authority acquisition module 130 is connected to the operation authority confirmation module 126 and the authentication authority status storing module 134. The operator authority acquisition module 130 acquires authority granted to the operator of interest from the authentication authority status storing module 134, and transmits the authority to the operation authority confirmation module 126.

The checker authority acquisition module 132 is connected to the operation authority confirmation module 126 and the authentication authority status storing module 134. The checker authority acquisition module 132 acquires authority granted to the checker of interest from the authentication authority status storing module 134, and transmits the authority to the operation authority confirmation module 126.

The authentication authority status storing module 134 is connected to the operator verification/authentication module 122, the checker verification/authentication module 124, the operator authority acquisition module 130, the checker authority acquisition module 132, and the network connection module 136. The authentication authority status storing module 134 stores operator identification information (operator ID) for identifying the operator and checker identification information (checker ID) for identifying the operator corresponding to the operator. The authentication authority status storing module 134 also stores authority granted to the checker, and the like. For example, the authentication authority status storing module 134 stores an authentication information table 900. FIG. 9 illustrates an example of the data configuration of the authentication information table 900.

The authentication information table 900 has an "operator" field 910, an "operator authentication status" field 920, a "threshold for document pages to be printed" field 930, a "threshold for document pages to be read" field 940, a "schedule (operator)" field 950, a "checker" field 960, a "checker authentication status" field 970, and a "schedule (checker)" field 980. The "operator" field 910 stores the operator ID. The "operator authentication status" field 920 stores the authentication status of the operator. The "threshold for document pages to be printed" field 930 stores the threshold for the number of document pages that the operator is allowed to print. The "threshold for document pages to be read" field 940 stores the threshold for the number of document pages that the operator is allowed to read. The "schedule (operator)" field 950 stores the schedule of the operator. The "checker" field 960 stores the checker ID. The "checker authentication status" field 970 stores the authentication status of the checker. The "schedule (checker)" field 980 stores the schedule of the checker. Further, the authority (corresponding to the "threshold for document pages to be printed" field 930 and the "threshold for document pages to be read" field 940) granted to the checker may be stored.

In this authentication information table 900, the "operator" field 910 contains A and B as operators. The "operator authentication status" field 920 contains the status of the operator, indicating whether the operator is authenticated. This information is reset (to indicate the unauthenticated state) if the operator leaves the processing apparatus after being authenticated. A determination as to whether the operator has left the processing apparatus may be made using the camera 114 installed near the processing apparatus, or on the basis of the position of a location-enabled mobile device carried by the operator. The "threshold for document pages to be printed" field 930 contains a threshold for the number of document pages to be printed. If the number of pages to be actually printed is greater than the threshold, the presence of a checker is requested. Similarly, the "threshold for document pages to be read" field 940 contains a threshold related to reading. A determination as to whether this threshold is satisfied is made on the basis of the weight of the document placed on the automatic document feeder or the like. The "schedule (operator)" field 950 contains the schedule of the operator, which is used for determining whether the operator needs to leave the processing apparatus immediately. If the operator needs to leave the processing apparatus immediately and the checker is not present, execution of processing may be prevented. The "checker" field 960 contains one or more checkers corresponding to the operator. The "checker authentication status" field 970 contains the authentication status of the checker. Thus, if either one of the authentication status of the operator in the "operator authentication status" field 920 and the authentication status of the checker in the "checker authentication status" field 970 is "authenticated" in a period from execution to completion of processing, execution of the processing may be continued. If not, an operation may be performed in accordance with the settings of the processing apparatus, such as aborting the processing. The "schedule (checker)" field 980 contains the schedule of the checker. It is possible to select the checker in the order of registration, or select the checker who has time to spare.

The network connection module 136 is connected to the operator verification/authentication module 122, the checker verification/authentication module 124, and the authentication authority status storing module 134, and also is connected to the authentication authority information database 192 and a schedule database 194 through a communication line 198. The network connection module 136 transmits information received from the information processing apparatus 100 to the authentication authority information database 192 and the schedule database 194, acquires the authority of the authenticated operator and checker from the authentication authority information database 192, and acquires schedule information of the authenticated operator and checker from the schedule database 194. For example, the schedule information may be the schedule for a predetermined time period from the current date and time, for example. The "predetermined time period" may be, for example, a period assumed that the processing apparatus is used.

The image output module 138 is connected to the operation authority confirmation module 126, the operation receiving module 128, and the printer 182. The image output module 138 causes the printer 182 to execute processing in accordance with the operation content received from the operation receiving module 128. However, a determination of whether to execute the processing is made in accordance with an instruction from the operation authority confirmation module 126.

The image receiving module 140 is connected to the operation authority confirmation module 126, the operation receiving module 128, and the scanner 184. The image receiving module 140 causes the scanner 184 to execute processing in accordance with the operation content received from the operation receiving module 128. However, a determination of whether to execute the processing is made in accordance with an instruction from the operation authority confirmation module 126.

The printer 182 is connected to the image output module 138. The printer 182 executes print processing and the like under the control of the image output module 138.

The scanner 184 is connected to the image receiving module 140. The scanner 184 executes scan processing and the like under the control of the image receiving module 140. Note that the printer 182 and the scanner 184 may be integrated as an image processing apparatus 400. The printer 182 and the scanner 184 may also be embodied as a multifunction apparatus (image processing apparatus having two or more of functions of a scanner, a printer, a copier, a facsimile, and the like). The processing performed by the printer 182 and/or the scanner 184 may be called a job, a service, or the like.

The authentication authority information database 192 is connected to the network connection module 136 via the communication line 198. The authentication authority information database 192 manages authentication information of the users (including operators and checkers) and authority information with respect to the printer 182 and/or the scanner 184.

The schedule database 194 is connected to the network connection module 136 via the communication line 198. The schedule database 194 manages electronic schedule information of the users. For example, the schedule database 194 stores the date and time (year, month, day, hour, minute, second, and so on or any combination of these) in association with the event scheduled for this date and time.

An overview of an example of a process performed by the information processing apparatus 100 will be described. This description is intended to facilitate understanding of the information processing apparatus 100, and is not intended to explain all the processes or the necessary processes performed by the information processing apparatus 100.

The operator performs an authentication operation using the card reading module 116, which reads their IC card or the like, and the operation panel 118. When the authentication operation is performed, received information is transmitted from the operation receiving module 128 to the operator verification/authentication module 122. Thus, the authentication information table 900 illustrated in FIG. 9 is created on the basis of the authentication authority information database 192 and the schedule database 194 and is stored in the authentication authority status storing module 134. Thereafter, if the operator attempts to execute processing, processing information is obtained from the image receiving module 140 and the image output module 138 in accordance with information from the operation receiving module 128, and the operation authority confirmation module 126 determines whether the value is not greater than the corresponding threshold in the authentication information table 900. If the value is not greater than the threshold, it becomes possible to perform an operation normally, so that processing corresponding to the operation is performed. If the value is greater than the threshold, authentication of the checker is required. On the basis of information from the operation receiving module 128, the checker verification/authentication module 124 authenticates the checker, and the authentication information is updated from the authentication authority information database 192 and the schedule database 194. Then, as for the processing that requires authentication of the checker, after execution of the processing, if the operator or the checker is determined to be in the vicinity of the printer 182 and/or the scanner 184 by the operator verification/authentication module 122 or the checker verification/authentication module 124, the authentication state is determined to be maintained, so that the processing is continued. On the other hand, if neither the operator nor the checker is in the vicinity of the printer 182 or the scanner 184, the authenticated state is determined not to be maintained, so that the processing is aborted.

Note that in the case of executing processing again after authentication, the operation authority confirmation module 126 may confirm the authority again before performing the processing.

The authentication information held in the authentication authority status storing module 134 is updated every time the schedule of the operator or the checker is changed and every time the operator or the checker leaves the printer 182 and/or the scanner 184.

Figure 2:
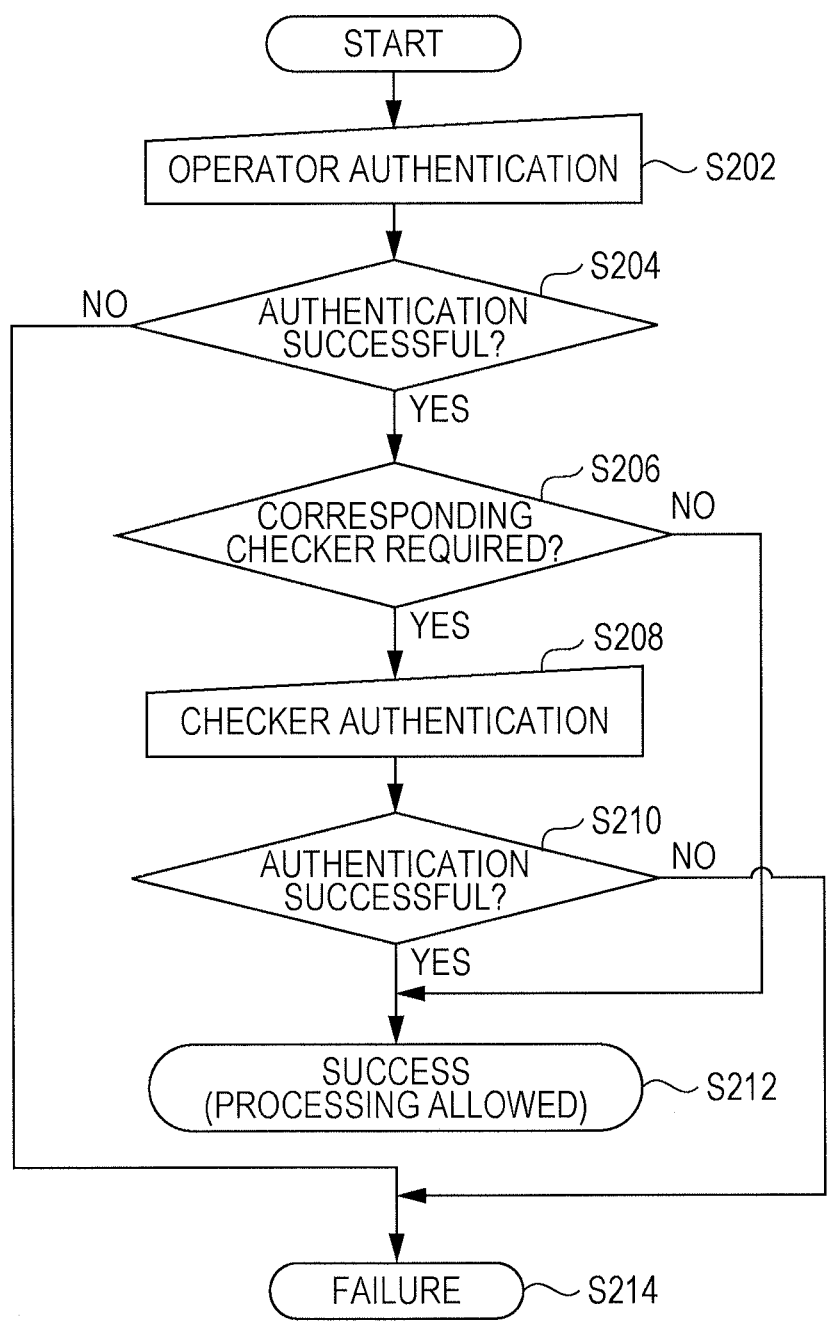
FIG. 2 is a flowchart illustrating an example of a process according to the first exemplary embodiment.

FIG. 2 is a flowchart illustrating an example of a process according to the first exemplary embodiment.

In step S202, an operator authentication is performed.

In step S204, a determination is made as to whether the authentication is successful. If the authentication is successful, the process proceeds to step S206. If not, the process proceeds to step S214.

In step S206, a determination is made as to whether the corresponding checker is required. If the checker is required, the process proceeds to step S208. If not, the process proceeds to step S212.

In step S208, a checker authentication is performed.

In step S210, a determination is made as to whether the authentication is successful. If the authentication is successful, the process proceeds to step S212. If not, the process proceeds to step S214.

In step S212, success is determined (processing is allowed).

In step S214, failure is determined. That is, in the case where the operator cannot be authenticated, if the checker cannot be authenticated although the checker is required, operations on the processing apparatus are not allowed.

FIG. 2 illustrates an example of a basic flow according to the first exemplary embodiment. The operator performs personal identification and authentication, in front of the image processing apparatus 400, using an IC card or an authentication system such as a biometric authentication system (step S202). If the authentication fails (No in step S204), operations cannot be continued (step S214). If the personal authentication succeeds (Yes in step S204), a determination as to whether a checker 490 corresponding to an operator 480 is present, within the image processing apparatus 400 or on the basis of the authentication authority information database 192 provided outside the image processing apparatus 400. If the checker 490 corresponding to the operator 480 is not set (No in step S206), a determination is made that processing can be executed by the authenticated operator 480 alone, so that operations can be continued (step S212). If the corresponding checker 490 is required (Yes in step S206), the image processing apparatus 400 requests the checker 490 to perform authentication (step S208). If the authentication of the checker 490 fails (No in step S210), processing cannot be continued (step S214). If the authentication of the checker 490 succeeds (Yes in step S210), processing can be performed (step S212). The authentication of the checker 490 fails in the case where a person subjected to the authentication is not the checker 490, or in the case where authentication is not performed within a predetermined time period, for example. Further, the authenticated operator information and the authenticated checker information are retained until operations are completed. The cases where authentication of the operator 480 and the checker 490 is required before operations are actually performed include the case where the image processing apparatus 400 is used for the first time.

Figure 3:
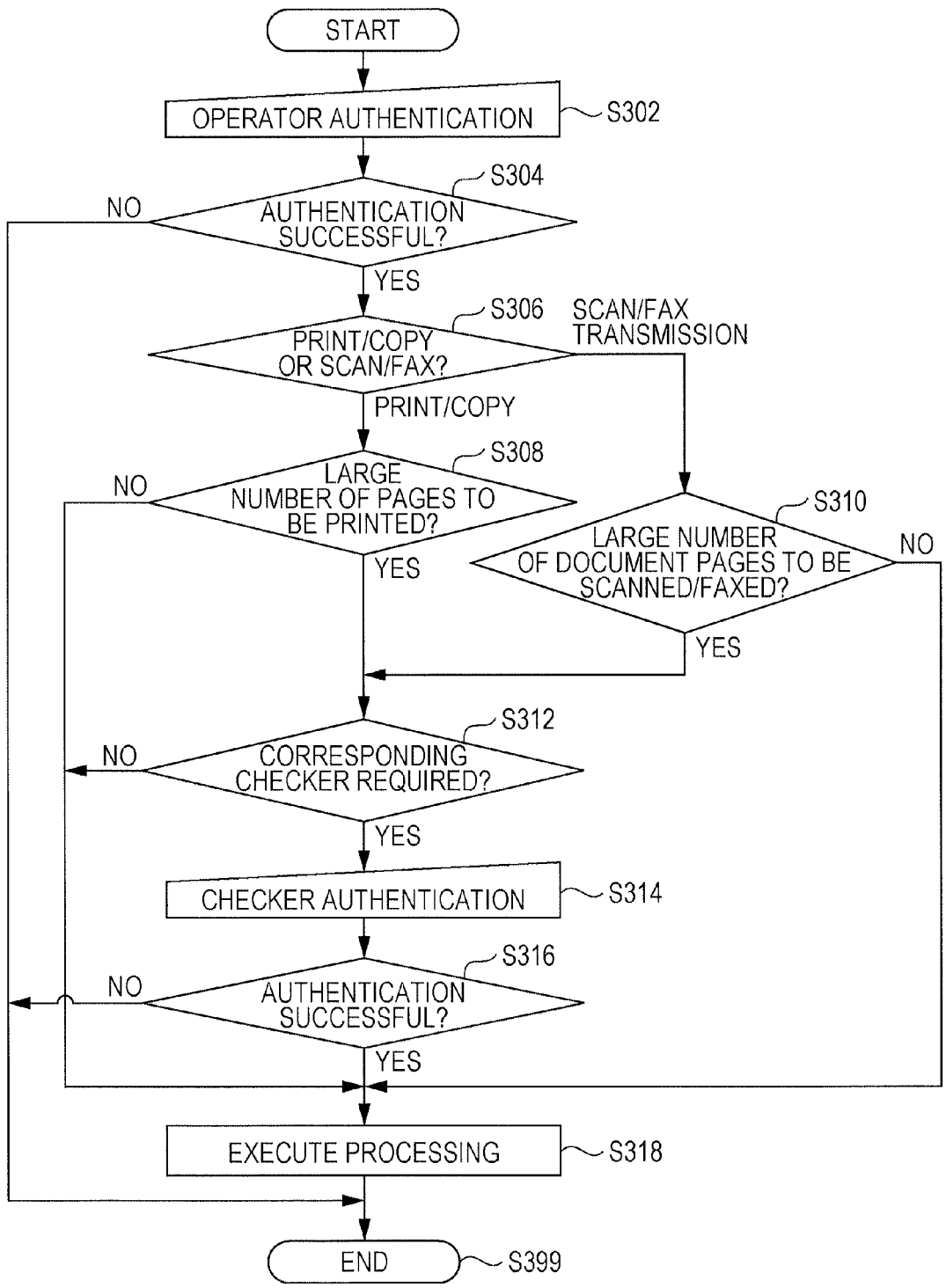
FIG. 3 is a flowchart illustrating an example of a process according to the first exemplary embodiment.

FIG. 3 is a flowchart illustrating an example of a process according to the first exemplary embodiment. More specifically, this flowchart illustrates an example of a process in the case where a checker is required when executing processing (during execution of processing).

In step S302, an operator authentication is performed.

In step S304, a determination is made as to whether the authentication is successful. If the authentication is successful, the process proceeds to step S306. If not, the process ends (step S399).

In step S306, a determination is made as to whether which of print/copy or scan/facsimile is specified. If print/copy is specified, the process proceeds to step S308. If scan/facsimile transmission is specified, the process proceeds to step S310.

In step S308, a determination is made as to whether the number of pages to be printed is large. If the number of pages is large, the process proceeds to step S312. If not, the process proceeds to step S318.

In step S310, a determination is made as to whether the number of document pages to be scanned/faxed is large. If the number of document pages is large, the process proceeds to step S312. If not, the process proceeds to step S318.

In step S312, a determination is made as to whether the corresponding checker is required. If the checker is required, the process proceeds to step S314. If not, the process proceeds to step S318. Note that in the case where the checker is determined to be required in step S312, that is, in the case where only the operator is authenticated and the determination made in step S308 or step S310 is Yes, a notification may be provided to the checker corresponding to the operator so as request the presence of the checker. For example, e-mail is transmitted or a phone call with a synthesized speech may be made to the checker, requesting the presence of the checker.

In step S314, a checker authentication is performed.

In step S316, a determination is made as to whether the authentication is successful. If the authentication is successful, the process proceeds to step S318. If not, the process ends (step S399). That is, in the case where the operator cannot be authenticated, if the checker cannot be authenticated although the checker is required, operations on the processing apparatus are not allowed.

In step S318, processing is executed.

FIG. 3 illustrates an example of the flow in the case where the checker 490 is required when executing processing. The operator 480 performs personal identification and authentication, in front of the image processing apparatus 400, using an IC card or an authentication system such as a biometric authentication system (step S302). If the personal authentication succeeds (Yes in step S304), execution of processing corresponding to an operation by the operator 480 is allowed. Thereafter, if the instruction indicates copying or printing (print/copy in step S306), and if the requested number of pages to be printed/copied is greater than the threshold for the number of pages that can be printed/copied in one batch, which is specified for each user (Yes in step S308), a determination as to whether the checker 490 corresponding to the operator 480 is present is made within the image processing apparatus 400 or on the basis of the authentication authority information database 192 (step S312). This threshold is not limited to the number of pages, and may be the estimated processing time. Further, the threshold is not limited to those related to copying and printing, and may be those applicable to the cases where an automatic document feeder is used for scanning or facsimile transmission (scan/facsimile in step S306) (step S310). If the checker 490 corresponding to the operator 480 is not set (No in step S312), an operation specified by the authenticated operator 480 or specified in the apparatus is continued (for example, performing printing until the number of pages printed reaches the upper limit, or aborting printing and notifying the checker 490). If the corresponding checker 490 is required (Yes in step S312), the image processing apparatus 400 requests authentication of the checker 490 (step S314). If the authentication of the checker 490 fails (No in step S316), processing cannot continue. If the authentication of the checker 490 succeeds (Yes in step S316), processing can be executed (step S318). Note that, in steps S308 and S310, a determination is made with respect to any one of or any combination of the following: (1) the amount of image data to be processed is equal to or greater than a predetermined value; (2) the processing time is equal to or greater than a predetermined value; and (3) the operator 480 has a scheduled event during execution of processing by the image processing apparatus 400. With regard to "(3) the operator 480 has a scheduled event during execution of processing by the image processing apparatus 400", the checker 490 is a person who takes over operations, or a person who replaces the operator 480.

FIG. 4 illustrates an example of a process according to the first exemplary embodiment. More specifically, FIG. 4 illustrates the case in which either one of the operator and the checker leaves during processing. FIG. 5 illustrates an example of the relationship between the authentication status and execution of processing. More specifically, FIG. 5 illustrates the relationship between the authentication status and execution of processing in the case where either one is absent. FIG. 6 illustrates an example of the relationship between the authentication status and execution of processing. More specifically, FIG. 6 illustrates an example of the relationship between the authentication status and processing execution in the case where the both are absent.

In the example illustrated in (a) of FIG. 4, the operator 480 is authenticated. Note that the image processing apparatus 400 incorporates the printer 182, the scanner 184, the card reading module 116, the operation panel 118, and the information processing apparatus 100. The operator 480 requires authentication of the checker 490. Alternatively, the processing content to be executed by an operation of the operator 480 requires authentication of the checker 490. As illustrated in the example of (b) of FIG. 4, after authentication of the checker 490, processing is executed in the image processing apparatus 400. Here, as illustrated in the examples of FIGS. 2 and 3, processing is executed in accordance with an instruction for execution of processing from the operator 480, on the condition that the operator 480 and the checker 490 are authenticated.

Then, as illustrated in the example of (c) of FIG. 4, in the case where the operator 480 leaves the image processing apparatus 400 due to the schedule of the operator 480, during execution of processing, the presence or absence of the checker 490 is confirmed. If the checker 490 is present, processing is continued. Also, in the case where the operator 480 returns and the checker 490 leaves, processing is continued.

A description will be given of the case where processing is continued, with reference to the example of FIG. 5. The status of the operator 480 changes from an authenticated state 582 to an unauthenticated state 584, and then to an authenticated state 586. The authenticated state 582 continues from time 502 to time 508; the unauthenticated state 584 continues from time 508 to time 510; and the authenticated state 586 continues from time 510 to time 516. The status of the checker 490 changes from an unauthenticated state 592 to an authenticated state 594, and then to an unauthenticated state 596. The unauthenticated state 592 continues from time 502 to time 504; the authenticated state 594 continues from time 504 to time 512; and the unauthenticated state 596 continues from time 512 to time 516. Processing execution 550 continues from time 506 to time 514.

That is, at time 506 at which the processing execution 550 starts, the operator 480 is in the authenticated state 582, and the checker 490 is in the authenticated state 594. At time 508 during the processing execution 550, although the operator 480 is placed in the unauthenticated state 584, the checker 490 remains in the authenticated state 594. Further, at time 512 during the processing execution 550, although the checker 490 is placed in the unauthenticated state 596, the operator 480 remains in the authenticated state 586. Accordingly, the processing execution 550 is continued until its completion at time 514.

In the case where both the operator 480 and checker 490 leave, an operation that is set in advance for the operator 480 or that is set in advance in the image processing apparatus 400 is performed. This operation may be, for example, suspending the processing and transmitting e-mail or making a phone call to the operator 480, the checker 490, or the system administrator of the image processing apparatus 400 so as to inform of the suspension.

A description will be given of the case where processing is suspended, with reference to the example of FIG. 6. The status of the operator 480 changes from an authenticated state 682 to an unauthenticated state 684, and then to an authenticated state 686. The authenticated state 682 continues from time 602 to time 608; the unauthenticated state 684 continues from time 608 to time 612; and the authenticated state 686 continues from time 612 to time 614. The status of the checker 490 changes from an unauthenticated state 692 to an authenticated state 694, and then to an unauthenticated state 696. The unauthenticated state 692 continues from time 602 to time 604; the authenticated state 694 continues from time 604 to time 610; and the unauthenticated state 696 continues from time 610 to time 614. Processing execution 650 continues from time 606 to time 610.

That is, at time 606 at which the processing execution 650 starts, the operator 480 is in the authenticated state 682, and the checker 490 is in the authenticated state 694. At time 608 during the processing execution 650, although the operator 480 is placed in the unauthenticated state 684, the checker 490 remains in the authenticated state 694 until time 610. The processing execution 650 continues even after time 608. However, at time 610, the status of the checker 490 is shifted from the authenticated state 694 to the unauthenticated state 696, so that the processing is put into suspension 652. That is, at time 610, the operator 480 is in the unauthenticated state 684 and the checker 490 is also in the unauthenticated state 696. That is, the both are in the unauthenticated state. Therefore, the processing execution 650 is put into suspension 652 at time 610.

FIG. 7 is a flowchart illustrating an example of a process according to the first exemplary embodiment. More specifically, FIG. 7 illustrates an example of the flow in the case where either one of the operator and the checker leaves during processing.

In step S702, authentication of the operator and the checker is successful.

In step S704, an instruction for execution of processing is issued.

In step S706, a determination is made as to whether execution of processing is completed. If execution of processing is completed, the process ends (step S799). If not, the process proceeds to step S708.

In step S708, a determination is made as to whether the operator is absent. If the operator is absent, the process proceeds to step S710. If not, the process returns to step S706.

In step S710, a determination is made as to whether the checker is absent. If the checker is absent, the process proceeds to step S712. If not, the process returns to step S706.

In step S712, execution of the processing is stopped, and a notification is provided to the operator and checker.

Note that the processing of step S708 and the processing of step S710 may be performed in any order or may be performed in parallel.

Second Exemplary Embodiment

A second exemplary embodiment is a case where the first exemplary embodiment is applied to a disabled person. The module configuration of the second exemplary embodiment is similar to that of the first exemplary embodiment illustrated in the example of FIG. 1. That is, an "operator" may be replaced with a "disabled person", and a "checker" may be replaced with a "helper".

The operator verification/authentication module 122 further recognizes that the operator is a disabled person (more specifically, wheelchair user) requiring assistance. This recognition processing will be described with reference to examples illustrated in FIGS. 10 through 14C.

If an operator (disabled person) performs an operation with which the operator requires assistance so as to cause a processing apparatus to execute processing, the operation authority confirmation module 126 controls the processing apparatus to execute the processing, on the condition that the helper is authenticated by the checker verification/authentication module 124. A determination as to whether an operation is one with which the operator requires assistance corresponds to the determinations of step S308 and step S310 of FIG. 3 and so on. That is, a determination may be made with respect to any one of or any combination of the following: (1) the amount of image data to be processed is equal to or greater than a predetermined value; (2) the processing time is equal to or greater than a predetermined value; and (3) the operator has a scheduled event during execution of processing by the processing apparatus. As for (1) and (2), events such as paper jam and lack of paper are likely to occur, and the operator cannot handle such events on their own and often requires a helper.

The checker verification/authentication module 124 determines whether the authenticated state of the checker who has already been authenticated by the checker verification/authentication module 124 is maintained.

Further, the operation authority confirmation module 126 controls the processing apparatus to continue the processing, on the condition that, after execution of the processing by the processing apparatus, the checker verification/authentication module 124 determines that the authenticated state of the checker is maintained. That is, in the case where the operator is in a situation that requires assistance, if the helper is not in front of the processing apparatus, operations cannot be continued.

Further, in the case where, after an event with which the operator requires assistance occurs in the processing apparatus, the event is eliminated, even if the authenticated state of the helper by the checker verification/authentication module 124 is not maintained, the checker verification/authentication module 124 controls the processing apparatus to continue processing. The "event with which the operator requires assistance" may be, in particular, lack of paper or the like, for example, in the case where the processing apparatus is an image processing apparatus. The "case where the event is eliminated" is the case where lack of paper or the like is eliminated (paper is refilled) by the helper. That is, in the case where lack of paper or the like occurs and then is eliminated, lack of paper or the like is less likely to occur again. Accordingly, in the case where the situation in which the operator requires assistance is eliminated, even if the helper leaves the processing apparatus, operations are allowed.

Figure 8:
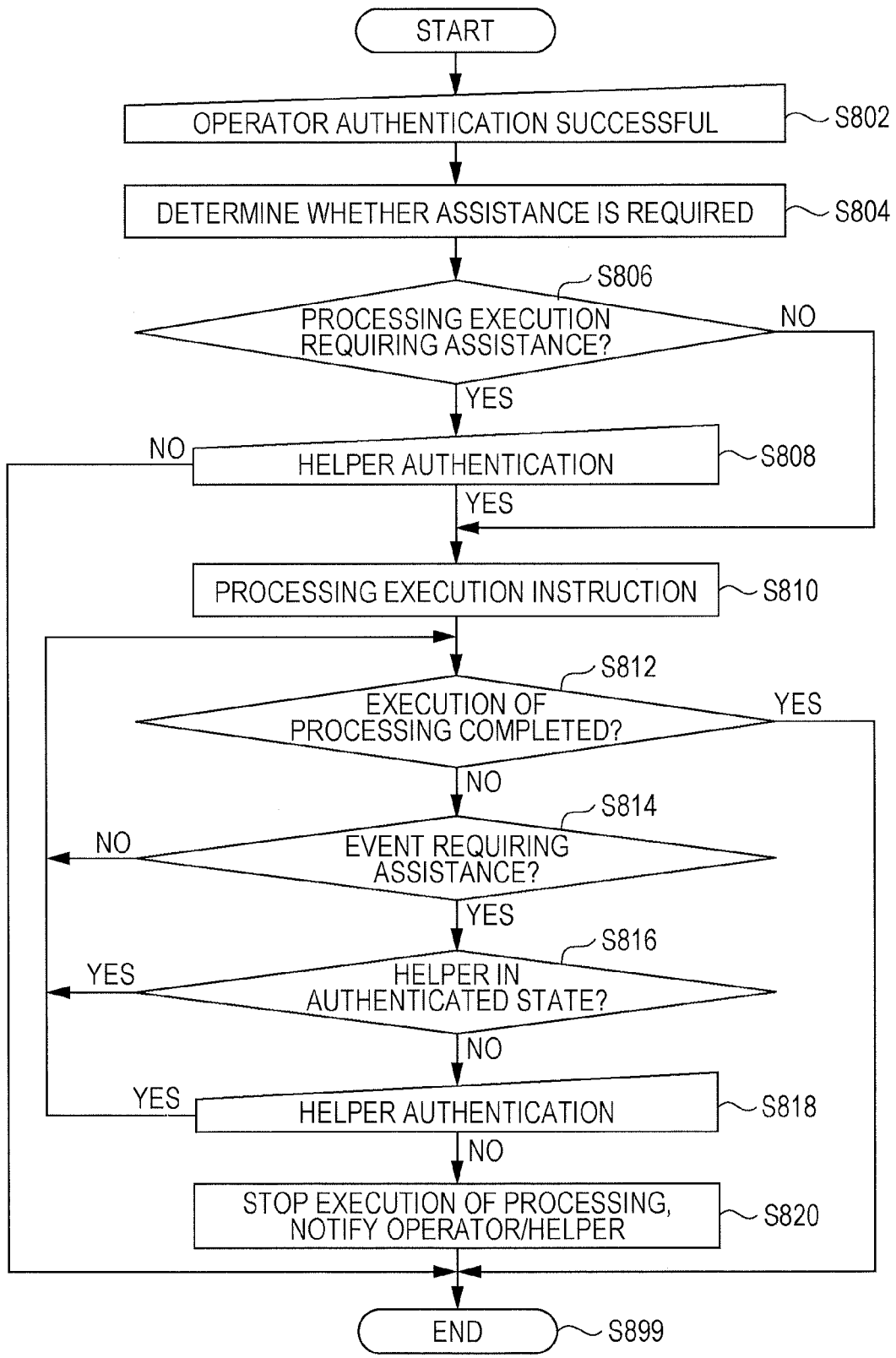
FIG. 8 is a flowchart illustrating an example of a process according to a second exemplary embodiment.

FIG. 8 is a flowchart illustrating an example of a process according to the second exemplary embodiment.

In step S802, authentication of the operator (disable person) is successful.

In step S804, a determination is made as to whether assistance is required. In this example, the recognition result indicating that the operator is a disabled person requiring assistance is used. This recognition processing will be described with reference to examples illustrated in FIGS. 10 through 14C.

In step S806, a determination is made as to whether execution of processing requires assistance. If execution of processing requires assistance, the process proceeds to step S808. If not, the process proceeds to step S810. This determination corresponds to the determinations of step S308 and step S310 of FIG. 3 and so on. That is, a determination may be made with respect to any one of or any combination of the following: (1) the amount of image data to be processed is equal to or greater than a predetermined value; (2) the processing time is equal to or greater than a predetermined value; and (3) the operator has a scheduled event during execution of processing by the processing apparatus.

In step S808, authentication of the helper is performed.

In step S810, an instruction for execution of processing is issued.

In step S812, a determination is made as to whether execution of processing is completed. If execution of processing is completed, the process ends (step S899). If not, the process proceeds to step S814.

In step S814, a determination is made as to whether an event that requires assistance has occurred. If an event that requires assistance has occurred, the process proceeds to step S816. If not, the process returns to step S812.

In step S816, a determination is made as to whether the helper is in the authenticated state. If the helper is in the authenticated state, the process returns to step S812 (in which the occurred event is eliminated). If not, the process proceeds to step S818.

In step S818, authentication of the helper is performed. If the helper is authenticated, since the helper is around, the processing is continued (the occurred event is eliminated).

In step S820, execution of the processing is stopped, and a notification is provided to the operator and checker.

On the condition that the operator 480 is authenticated (step S802), a determination is made as to whether the operator 480 requires assistance (or whether there is any operation that requires assistance) (step S804). Determination in the case of the wheelchair user 1090 will be described below. The detail of disability may be registered in advance in a database. If assistance is required (Yes in step S806), authentication of the helper is performed (step S808). If the authentication succeeds (Yes in step S808), processing can be continued with assistance (step S810). For example, in the case where the user has hearing difficulties, the user does not notice that someone is behind them, which might result in information leakage. However, if a reliable helper is present, such risk can be reduced. Further, if no assistance is required for execution of processing (No in step S806), an instruction for execution of processing is issued (step S810). Execution of processing that is determined to require assistance in step S806 may be scanning/copying a large amount of documents placed on the automatic document feeder or the like. After the processing is started, in the case an event that requires assistance occurs (Yes in step S814), if the helper is not in the authenticated state (No in step S814), a helper authentication is performed (step S818). The event that requires assistance may be replacing paper in the tray of the image processing apparatus 400, clearing a paper jam, or the like. If the authentication of the helper succeeds, the event that requires assistance is eliminated, the processing can be continued.

Here, a description will be given of the case of print-on-demand which is a system for submitting and storing a print job in the image processing apparatus 400 in advance and then performing printing by operating the image processing apparatus 400. Since the paper size used in the print-on-demand is known in advance, in the case where wrong size paper is set, the operator 480 approaching the image processing apparatus 400 is detected. Further, in the case where the helper corresponding to the operator 480 is in the vicinity of the image processing apparatus 400, a message that prompts the helper to replace the paper trays may be displayed on the display of the image processing apparatus 400.

Further, in the authentication information table 900 of FIG. 9, the type of disability, and the corresponding services, functions, processing apparatuses, options and the like that require assistance may also be managed for disabled persons. For example, although it is difficult for wheelchair users to replace paper trays and to use the automatic document feeder and the like, the wheelchair users can replace paper trays and use the automatic document feeder and the like with assistance of a helper. Therefore, a helper may be specified for replacement of paper trays and use of the automatic document feeder and the lie.

Hereinafter, a description will be given of a "process of recognizing that the operator is a disabled person requiring assistance", which is one of a part of processing performed by the operator verification/authentication module 122, with reference to FIGS. 10 through 14C. An operator who is "a disabled person requiring assistance" may be, for example, a wheelchair user.

Figure 10:
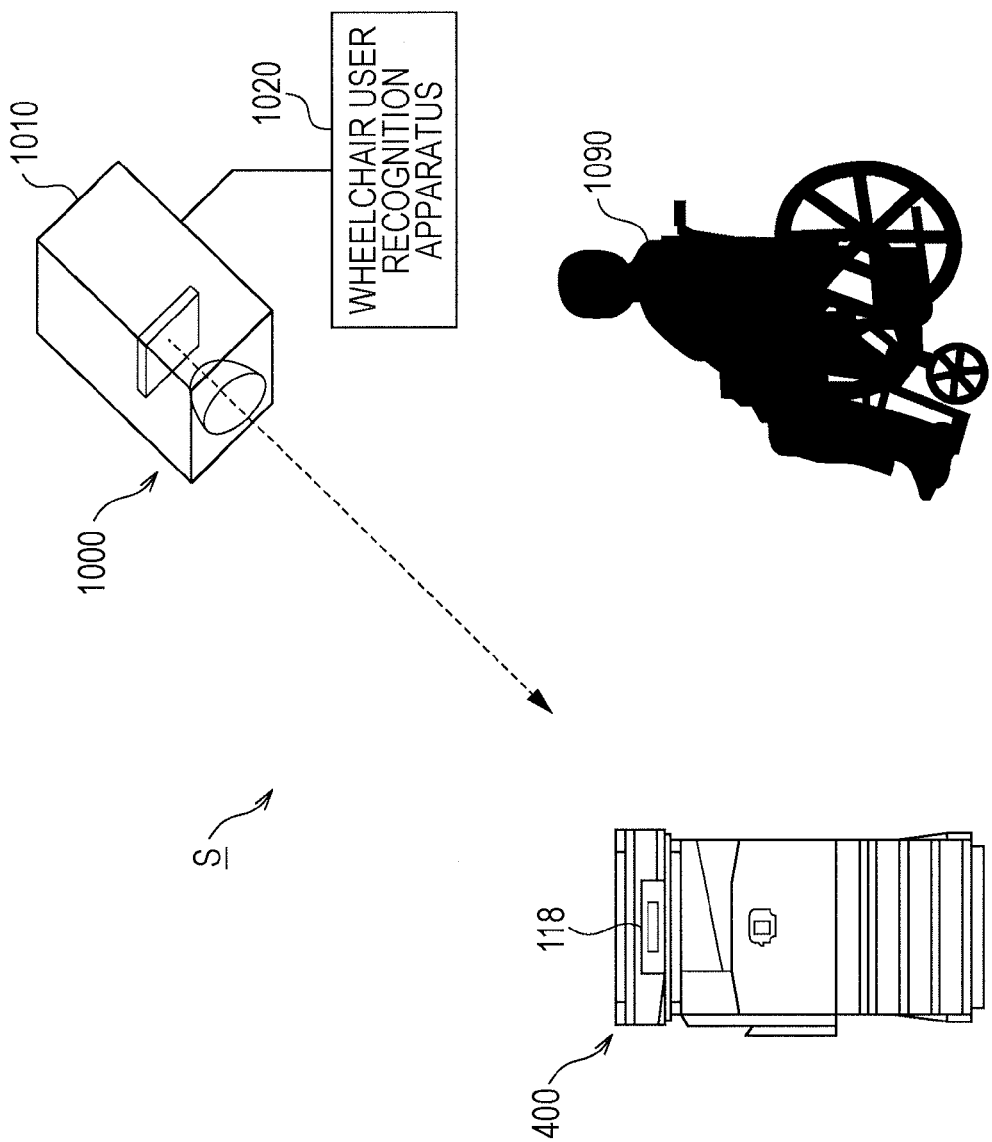
FIG. 10 illustrates a wheelchair user recognition system for recognizing that the user is a wheelchair user.

FIG. 10 illustrates a wheelchair user recognition system for recognizing that the user is a wheelchair user.

A wheelchair user recognition system S is an example of a part of the operator verification/authentication module 122. As illustrated in FIG. 10, the wheelchair user recognition system S includes the image processing apparatus 400 and a recognition apparatus 1000 as an example of a recognizing unit that recognizes that the user who places a document in the image processing apparatus 400 is a wheelchair user 1090. The recognition apparatus 1000 includes a camera 1010 as an example of an imaging unit that captures an image of the user, and a wheelchair user recognition apparatus 1020 as an example of a processing unit that recognizes whether the user is a wheelchair user on the basis of the image captures by the camera 1010.

Figure 11:
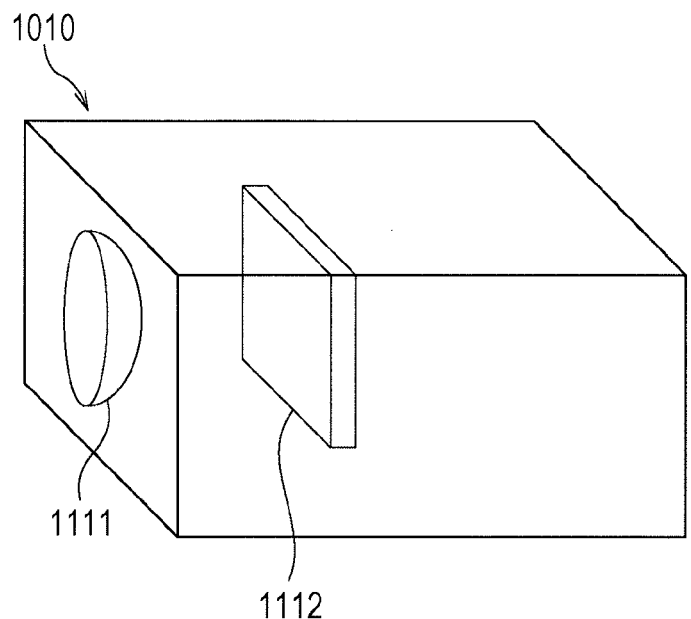
FIG. 11 illustrates an example of the configuration of a camera.

FIG. 11 illustrates an example of the configuration of the camera 1010.

The camera 1010 includes an optical system 1111 that converges the incident light, and an image sensor 1112 serving as an imaging unit that detects the light converged by the optical system 1111.

The optical system 1111 includes a single lens or a combination of lenses. Various aberrations are removed by a combination of lenses, a coating applied to the surface of the lens, and the like.

The image sensor 1112 includes an array of imaging elements such as charge-coupled devices (CCDs) and complementary metal oxide semiconductors (CMOSs).

Figure 12:
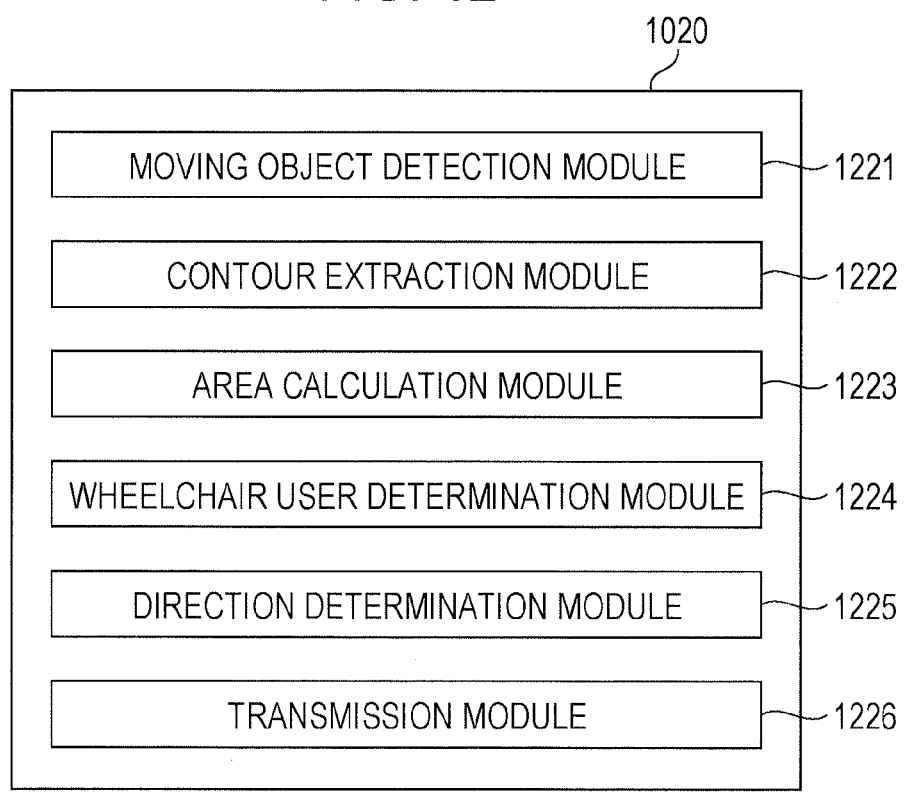
FIG. 12 illustrates an example of the functional configuration of a wheelchair user recognition apparatus.

FIG. 12 illustrates an example of the functional configuration of the wheelchair user recognition apparatus 1020.

The wheelchair user recognition apparatus 1020 is realized by a personal computer, for example. Further, as illustrated in FIG. 12, the wheelchair user recognition apparatus 1020 includes a moving object detection module 1221 that detects a moving object from the image captured by the camera 1010, a contour extraction module 1222 that extracts the contour of the moving object detected by the moving object detection module 1221, an area calculation module 1223 that calculates the area within the contour extracted by the contour extraction module 1222, a wheelchair user determination module 1224 that determines the moving object is a wheelchair user on the basis of the area calculated by the area calculation module 1223, a direction determination module 1225 that determines the direction in which the user is facing in the case where the moving object is a wheelchair user, and a transmission module 1226 that transmits determination results of the wheelchair user determination module 1224 and the direction determination module 1225 to the image processing apparatus 400.

Figure 13:
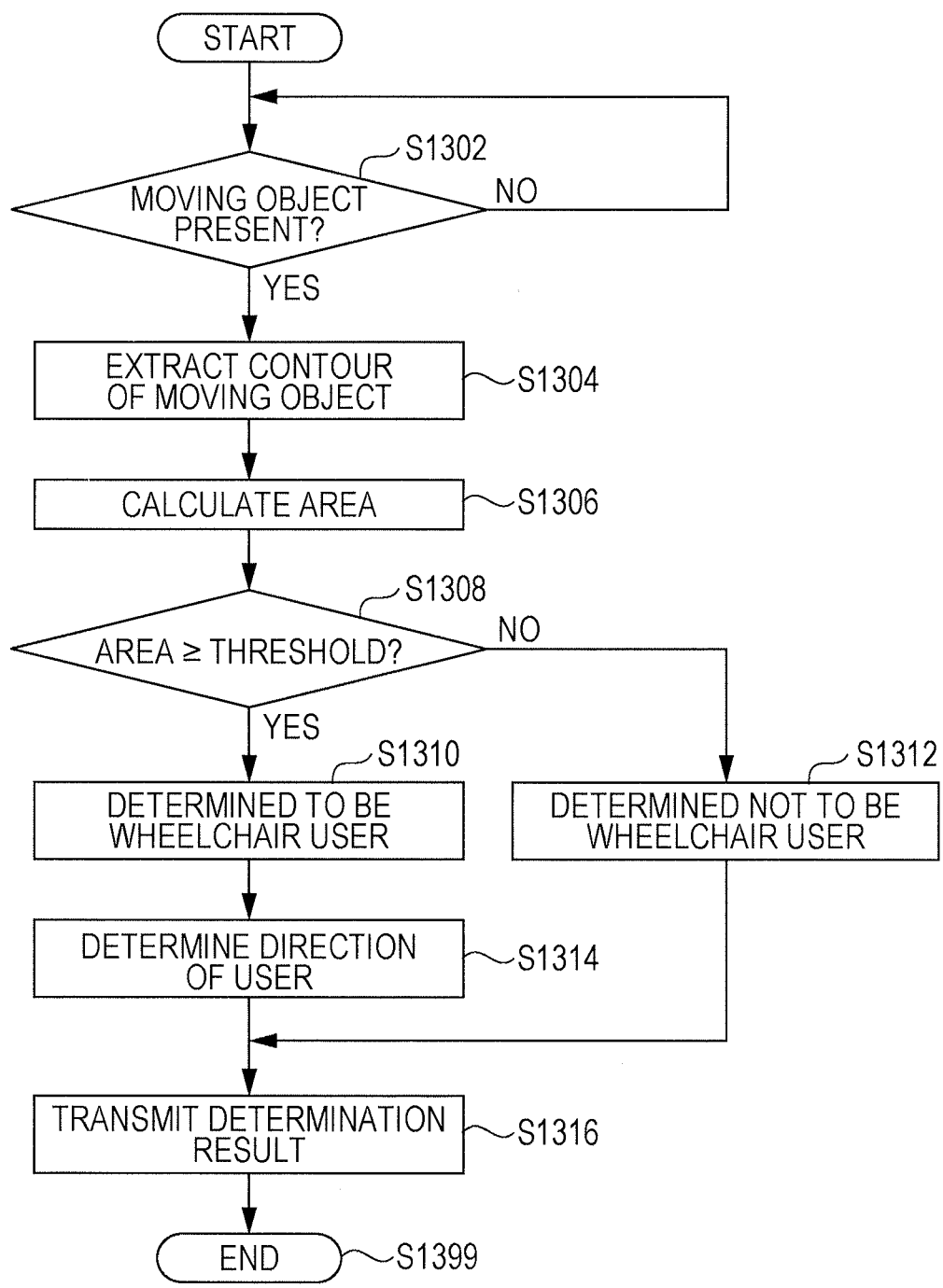
FIG. 13 is a flowchart illustrating operations of the wheelchair user recognition apparatus.

FIG. 13 is a flowchart illustrating operations of the wheelchair user recognition apparatus 1020.

Hereinafter, the overview of operations performed by the wheelchair user recognition apparatus 1020 will be described, with reference to FIGS. 12 and 13.

First, the moving object detection module 1221 acquires an image captured by the camera 1010, and determines whether a moving object is present in the image (step S1302). Then, if no moving object is detected by the moving object detection module 1221 (No in step S1302), the process returns to step S1302.

On the other hand, if a moving object is detected by the moving object detection module 1221 (Yes in step S1302), the contour extraction module 1222 extracts the contour of the moving object (step S1304). Then, the area calculation module 1223 calculates the area of the portion that is surrounded by the contour extracted by the contour extraction module 1222 (step S1306).

Then, the wheelchair user determination module 1224 determines whether the moving object is a wheelchair user. More specifically, the wheelchair user determination module 1224 determines whether the area calculated by the area calculation module 1223 is equal to or greater than a predetermined threshold (step S1308). If the area is equal to or greater than the predetermined threshold (Yes in step S1308), the wheelchair user determination module 1224 determines that the moving object is a wheelchair user (step S1310). If the area is less than the predetermined threshold (No in step S1308), the wheelchair user determination module 1224 determines that the moving object is not a wheelchair user (step S1312). The area covered by a wheelchair user is greater than the area covered by a non-wheelchair user due to their wheelchair, when viewed from the above. Therefore, by setting an appropriate threshold, it is possible to determine whether a moving object is a wheelchair user on the basis of the area covered in the image. Further, in the case where the aspect ratio of the circumscribed rectangle of the contour of the moving object is in a predetermined range, the moving object may be determined to be a wheelchair user.

Note that the wheelchair user determination module 1224 may determine not only a wheelchair user, but also a helper who helps the wheelchair user. More specifically, in the caser where there are two contours detected by the moving object detection module 1221 and extracted by the contour extraction module 1222, if one of the areas calculated by the area calculation module 1223 is greater than the threshold and the other is less than the threshold, the wheelchair user determination module 1224 determines that one of the areas is a wheelchair user and the other is a helper.

Further, if the moving object is a wheelchair user, the direction determination module 1225 determines the direction of the user on the basis of the moving direction and the shape of the moving object (step S1314).

Figure 14C:
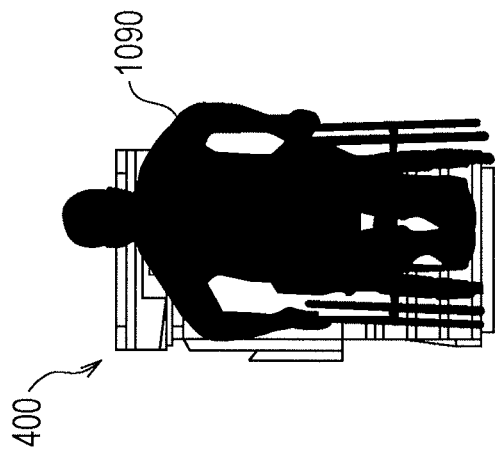
FIGS. 14A through 14C illustrate the directions of the user and their wheelchair in the case where the user is a wheelchair user.
Figure 14B:
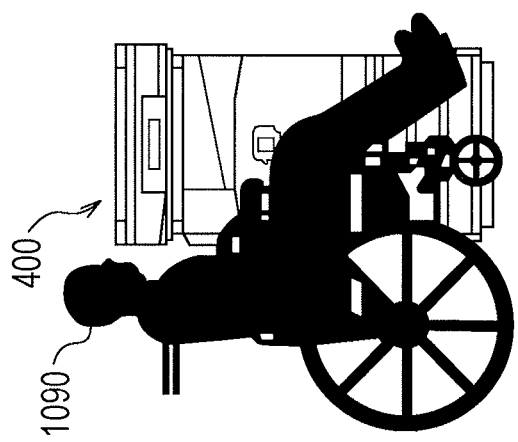
Figure 14A:
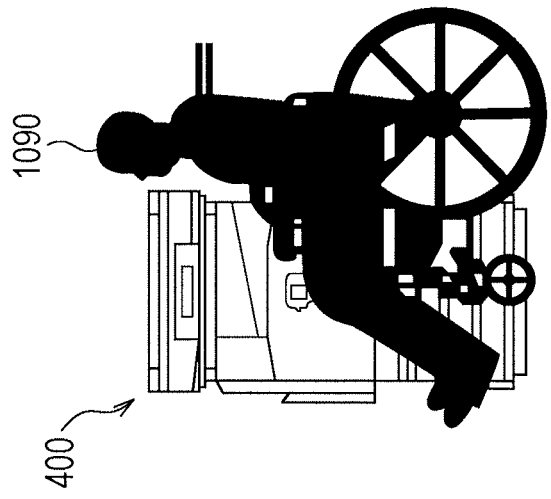

FIGS. 14A through 14C illustrate the directions of the user and their wheelchair in front of the image processing apparatus 400 in the case where the user is a wheelchair user 1090.

If the user is the wheelchair user 1090, the user often faces one of the three directions illustrated in FIGS. 14A through 14C, in front of the image processing apparatus 400.

FIG. 14A illustrates the case where the wheelchair user faces the left direction if the direction of the image processing apparatus 400 is defined as the front direction. That is, in this case, the user and the wheelchair face the left direction with respect to the image processing apparatus 400.

Further, FIG. 14B illustrates the case where the wheelchair user faces the right direction if the direction of the image processing apparatus 400 is defined as the front direction. That is, in this case, the user and the wheelchair face the right direction with respect to the image processing apparatus 400.

Further, FIG. 14C illustrates the case where the wheelchair user faces the image processing apparatus 400. That is, in this case, the user and the wheelchair face the front of the image processing apparatus 400.

Referring back to FIG. 13, the transmission module 1226 transmits the determination results of the wheelchair user determination module 1224 and the direction determination module 1225 to the image processing apparatus 400 (step S1316). If the determination result of the wheelchair user determination module 1224 indicates that the user is a wheelchair user, information indicating that the user is a wheelchair user and containing information on the direction of the user to the information processing apparatus 100. Further, in this exemplary embodiment, if a helper is recognized, the transmission module 1226 transmits information indicating the presence of a helper.

On the other hand, if the determination result of the wheelchair user determination module 1224 indicates that the user is not a wheelchair user, information indicating that the user is not a wheelchair user to the information processing apparatus 100.

Thus, the information processing apparatus 100 (the operator verification/authentication module 122) can detect whether the user is a wheelchair user.

Figure 15:
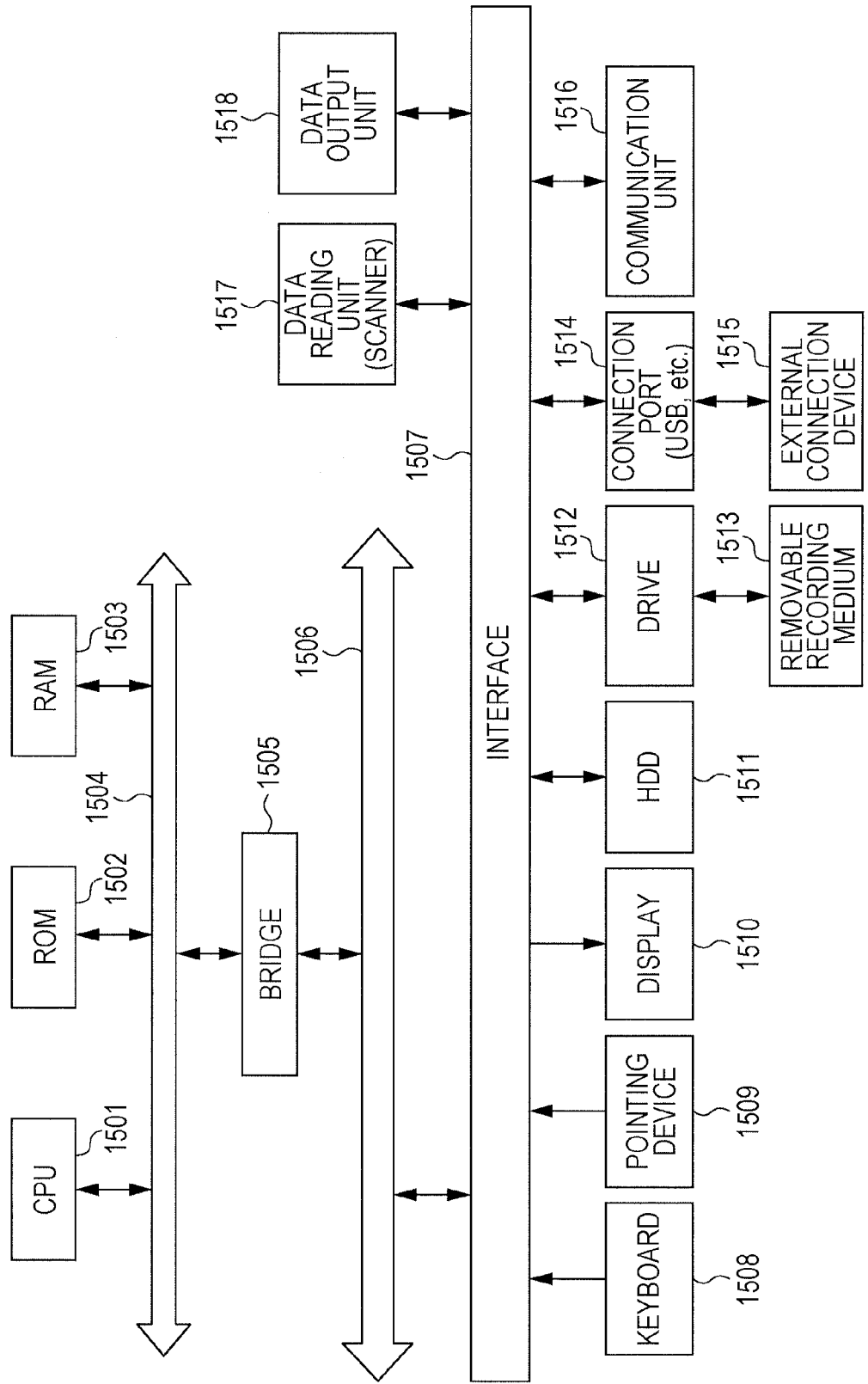
FIG. 15 is a block diagram illustrating an example of the hardware configuration of a computer that realizes an exemplary embodiment.

An example of the hardware configuration of an information processing apparatus of this exemplary embodiment including the printer 182 and the scanner 184 will be described with reference to FIG. 15. The configuration illustrated in FIG. 15 is of, for example, a personal computer (PC) and the like. The illustrated example of the hardware configuration includes a data reading unit 1517 such as a scanner, and a data output unit 1518 such as a printer.

A central processing unit (CPU) 1501 is a controller that executes processing in accordance with a computer program describing an execution sequence of each of the modules described in the above exemplary embodiment, namely, the operator/checker information acquisition module 110, the operator verification/authentication module 122, the checker verification/authentication module 124, the operation authority confirmation module 126, the operation receiving module 128, the operator authority acquisition module 130, the checker authority acquisition module 132, the authentication authority status storing module 134, the network connection module 136, the image output module 138, and the image receiving module 140.

A read only memory (ROM) 1502 stores programs, operation parameters, and the like, which are used by the CPU 1501. A random access memory (RAM) 1503 stores programs that are used by being executed by the CPU 1501 and parameters that are changed as necessary upon execution. These components are connected to one another by a host bus 1504 including a CPU bus or the like.

The host bus 1504 is connected to an external bus 1506 such as a peripheral component interconnect/interface (PCI) through a bridge 1505.

A keyboard 1508 and a pointing device 1509 such as a mouse are input devices which are operated by the operator. A display 1510 may be a liquid crystal display, a cathode ray tube (CRT), or the like, and displays various types of information as text or image information.

A hard disk drive (HDD) 1511 includes a hard disk. The HDD 1511 drives the hard disk so as to record or reproduce a program executed by the CPU 1501 and information. The hard disk stores the authentication authority status and the like. Furthermore, the hard disk stores various computer programs, such as various data processing programs.

A drive 1512 reads data or a program recorded in a removable recording medium 1513 loaded therein, such as a magnetic disk, an optical disc, a magneto-optical disc, or a semiconductor memory, and provides the data or program to the RAM 1503 via an interface 1507, the external bus 1506, the bridge 1505, and the host bus 1504. The removable recording medium 1513 is usable as a data recording region similar to the hard disk.

A connection port 1514 is a port to which an external connection device 1515 is connected, and has a connection part for USB, IEEE 1394, and the like. The connection port 1514 is connected to the CPU 1501 and the like via the interface 1507, the external bus 1506, the bridge 1505, the host bus 1504, and so on. A communication unit 1516 is connected to a communication line and executes data communication processing with the outside. The data reading unit 1517 is a scanner, for example, and reads a document. The data output unit 1518 is a printer, for example, and outputs document data.

The hardware configuration of the information processing apparatus illustrated in FIG. 15 is an exemplary configuration. The hardware configuration of the information processing apparatus of this exemplary embodiment is not limited to the configuration illustrated in FIG. 15, and any configuration may be employed as long as the modules described in this exemplary embodiment are executable therein. For example, some of the modules may be constituted by dedicated hardware (for example, application specific integrated circuit (ASIC) or the like), and some of the modules may be provided in an external system and may be connected via a communication line. Furthermore, plural systems, each being the system illustrated in FIG. 15, may be connected to one another via a communication line so as to operate in cooperation with one another. Alternatively, the information processing apparatus may be incorporated in a copier, a facsimile machine, a scanner, a printer, or a multifunction apparatus.

In the above-described exemplary embodiments, the information processing apparatus 100 controls operations performed by the printer 182 and/or the scanner 184. However, the processing apparatus is not limited to those described above, and may be a system product used for operating home appliances, vehicles such as automobiles and trains, and the like, that require authentication of the operator.

Although the phrases "equal to or greater than", "less than or equal to", "greater than" and "less than" are used in the above-described exemplary embodiments, these phrases may be replaced with "greater than", "less than", "equal to or greater than" and "less than or equal to", respectively, as long as no contradiction occurs when used in combination.

The above-described program may be provided by being stored in a recording medium or by a communication unit. In this case, the above-described program may be recognized as an invention of a "computer readable recording medium having a program recorded therein".

The "computer readable recording medium having a program recorded therein" is a computer readable recording medium storing a program and used for installation, execution, or distribution of the program.

Examples of the recording medium include, for example, digital versatile discs (DVDs), such as a DVD-R, a DVD-RW, and a DVD-RAM which are based on the standard designed by the DVD forum, and such as a DVD+R and a DVD+RW which are based on the standard designed by DVD+RW. Also, examples of the recording medium include compact discs (CDs), such as a CD-ROM, a CD recordable (CD-R), and a CD rewritable (CD-RW). Furthermore, examples of the recording medium include a Blu-ray (registered trademark) Disc, a magneto-optical disc (MO), a flexible disk (FD), a magnetic tape, a hard disk, a read only memory (ROM), an electrically erasable and programmable ROM (EEPROM (registered trademark)), a flash memory, a random access memory (RAM), and a secure digital memory card (SD memory card).

The above-described program or part of the program may be recorded on the recording medium so as to be stored or distributed. Alternatively, the program or part of the program may be transmitted via a wired network, such as a local area network (LAN), a metropolitan area network (MAN), a wide area network (WAN), the Internet, an intranet, or an extranet, or via a wireless communication network. Furthermore, the program or part of the program may be transmitted using a transmission medium including a combination of the foregoing media, or may be transmitted using carrier waves.

Furthermore, the foregoing program may be part of another program, and may be recorded on a recording medium together with another program. Also, the program may be divided and recorded on multiple recording media. The program may be recorded in any form, for example, a compressed form or an encrypted form, as long as the program may be decompressed or decrypted.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
at least one processor;
an operator authenticating unit, implemented by the at least one processor, configured to authenticate an operator;
a recognizing apparatus configured to recognize that the operator is a disabled person requiring assistance;
a helper authenticating unit, implemented by the at least one processor, configured to authenticate a helper corresponding to the operator authenticated by the operator authenticating unit, using a memory storing operator identification information for identifying the operator and helper identification information for identifying the helper corresponding to the operator; and
a controller, implemented by the at least one processor, configured to control, in response to the operator's operation with which the operator requires assistance so as to cause a processing apparatus to execute processing, the processing apparatus to execute the processing, on a condition that the helper is authenticated by the helper authenticating unit.

2. The information processing apparatus according to claim 1, further comprising:
a second acquirer configured to acquire information for specifying a helper; and
a second determining unit, implemented by the at least one processor, configured to determine whether information on the helper authenticated by the helper authenticating unit is continuously acquired;
wherein the controller controls the processing apparatus to continue the processing, on a condition that, after execution of the processing by the processing apparatus, the second determining unit determines that the information on the helper is continuously acquired.

3. The information processing apparatus according to claim 1, wherein in a case where, after an event, with which the operator requires assistance, is eliminated, the controller controls the processing apparatus to continue the processing even if the information on the helper is not continuously acquired.

* * * * *